Oct. 26, 1948.    G. V. WOODLING    2,452,275
TUBE FITTING COUPLING
Filed Dec. 22, 1944
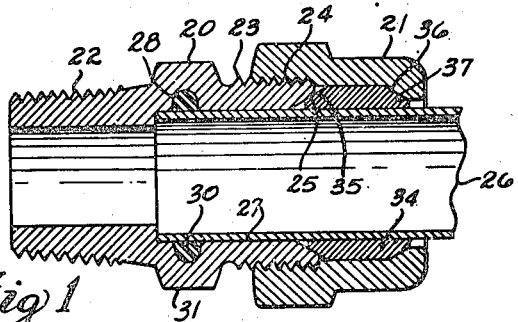
Fig. 1
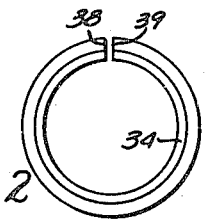
Fig. 2
Fig. 3
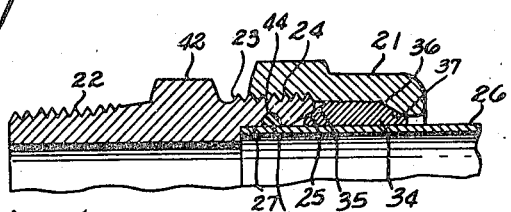
Fig. 4
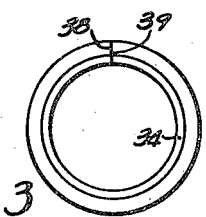
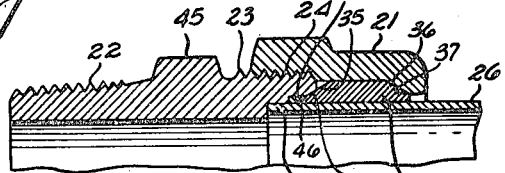
Fig. 5
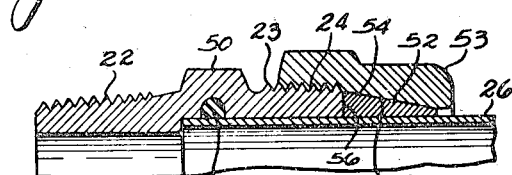
Fig. 6
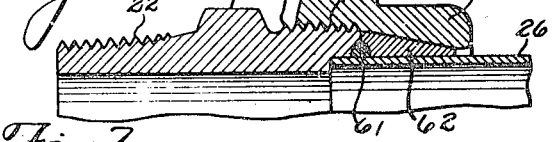
Fig. 7
INVENTOR.
BY George V. Woodling.

Patented Oct. 26, 1948

2,452,275

UNITED STATES PATENT OFFICE 2,452,275

TUBE FITTING COUPLING

George V. Woodling, Cleveland, Ohio

Application December 22, 1944, Serial No. 569,350

2 Claims. (Cl. 285—122)

My invention relates in general to connecting devices and more particularly to connecting devices for tube fittings.

The invention is not limited to tube fittings, but includes any application wherein a substantially round element is connected to another element.

An object of my invention is the provision of connecting a substantially round element or tube to a coupling element by employing contractible means for annularly engaging the outer surface of the round element or tube.

Another object of my invention is a provision of a coupling which prevents water or other moisture from entering the assembly or from getting next adjacent to the pipe, thereby eliminating the possibility of the moisture freezing next to the pipe and causing the pipe to be compressed inwardly and rendering the coupling defective.

Another object of my invention is the provision of applying substantially equal pressure to each end of the contractible means or collar, whereby the contractible means or collar is forceably contracted about the pipe in an even manner to give substantially an even distribution of stresses.

Another object of my invention is the provision of a contractible means which functions substantially as a lock washer to prevent the compression nut from becoming loose under vibration.

Another object of my invention is the provision of anchoring a tube to a coupling or fitting element without the employment of a flare on the end of the tube.

Another object of my invention is the provision of a contractible means which is adapted to be contracted about the tube and which constitutes the only means of holding the tube against longitudinal movement relative to the coupling or fitting element.

Another object of my invention is the provision of locating the sealing ring in the body of the fitting element which has the greatest wall thickness.

Another object of my invention is the provision of locating the sealing ring in the hexagonal nut portion of the fitting element.

Another object of my invention is the provision of locating the sealing ring in the threaded body portion of the fitting element.

Another object of my invention is the provision of locating the sealing ring between the fitting element and the contractible means.

Another object of my invention is the provision of anchoring or connecting a tube to a coupling element whereby the vibration of the tube is absorbed.

Another object of my invention is to control the amount of the contractible movement of the contractible means which engages the tube.

Another object of my invention is to prevent the parts from being assembled in the wrong way.

Other objects and a fuller understanding of my invention may be had by referring to the following description and claims taken in conjunction with the accompanying drawing in which:

Figure 1 is a longitudinal cross-sectional view of a tube fitting or coupling device embodying the features of my invention;

Figure 2 is a front view of the split collar or contractible means of my invention, shown in the uncontractible position;

Figure 3 is a view similar to Figure 2, showing the split collar or contractible means in the contractible position;

Figure 4 is a modified form of the coupling with the sealing ring located in the threaded body portion of the fitting element;

Figure 5 is a further modified form of the coupling with the sealing ring located between the fitting element and the contractible means or split collar;

Figure 6 shows a modified form of the split collar, and

Figure 7 shows a split collar as shown in Figure 6, with a sealing ring between the collar and the fitting element.

With reference to Figure 1 of the drawing, my invention is shown as being applied to a tube fitting or coupling device comprising a coupling element 20, a tube 26 adapted to being connected thereto, and a compression nut 21. The left-hand end of the coupling or fitting element 20 is provided with threads 22 which are usually in the forms of pipe thread for engaging a cylinder or other fluid connecting devices. The right-hand end of the coupling element 20 is provided with male threads 23 to which is threadably attached the compression or sleeve nut 21 having female threads 24 which threadably engage the male threads 22. The coupling or fitting element 20 is provided with a bore 27 in which the end of the tube 26 is inserted. The right-hand end of the coupling or fitting element 20 is provided with an internal conical abutment end surface 25 constituting a cam surface. As shown in the present drawing, the angle of the conical abutment is in the neighborhood of 37°, but it is to be understood that the angle may be varied to accommodate particular engineering requirements.

A contactible means or split collar 34 is adapted to engage the cam surface 25 and be contracted about the tube 26 at a place remote from the end of the tube. The split collar 34 has reversible and substantially identical end surfaces 35 and 36, each constituting substantially an external conical cam surface with the conical or cam surface 35 engaging the internal conical or cam surface 25 of the fitting element. The right-hand end of the compression nut 21 is provided with internal conical or cam surface 37 which is adapted to engage the external cam surface 36 of the split collar 34, whereby the split collar 34 is forcibly contracted by wedging or cam pressure upon both ends thereof around the tube 26 to clamp the tube against longitudinal movement with reference to the compression nut 21. The angles of the abutting cam or conical surface are substantially identical on all the parts, being in the neighborhood of 37°, which is less than 45° where the tangent is one, whereby the inward movement is slower than the longitudinal movement. Thus, the engagement between the came surfaces 36 and 37 function substantially as a good frictional lock washer against the compression nut 21 becoming loose. It is to be noted that the split collar cannot be assembled in the wrong way since it is reversible. The split-ends of the split collar 34 are identified by the reference characters 38 and 39, see Figures 2 and 3, and as the compression nut 21 is turned on tighter to the coupling or fitting element 20 the split collar 34 is compressed about the tube 26 until the two split ends 38 and 39 come together as shown in Figure 3, at which time further contraction of the split collar is arrested. The space between the split ends 38 and 39 may be in the neighborhood of thirty to forty-five thousandths of an inch so that when the split collar is completely contracted there is a contraction of the tube in the neighborhood of ten to fifteen thousandths of an inch. I find from tests that the split collar 34 when completely contracted makes a good firm grip with the tube and will withstand a longitudinal pull on a steel tube to the extent of 1,000 pounds or more before the tube can be pulled out of the split collar 34. Accordingly, my invention obviates the need of a flare on the end of a tube. The elimination of the flare results in many advantages. One advantage is that no special flaring tools are required in applying my invention to a tube. Another benefit is that I do not rely on the flare to make the seal. With the flared end of a tube compressed against the coupling or fitting element, there is the possibility of the flare becoming "crushed" or "smashed" when too much torque is applied to the compression nut, in which event a leak may develop. Then, too, the "crushing" of the flare enables loose play to develop, whereby the grip of the split collar may be weakened, with the result the compression nut 21 may become loose. The split collar 34 may no longer function as a locked washer to keep the compression nut 21 from becoming loose. In other words, when the flared end of a tube is used, the compression nut 21 is preferably turned down by means of a torque wrench. In my invention the torque wrench may be unnecessary.

The cam or conical pressure incident to the cam pressures is applied upon both ends of the split collar 34 and thus the split collar engages the tube substantially in a parallel surface relationship with respect to each other and thereby give an even distribution of the compression stresses. In other words, the split collar 34 is not, so to speak, cocked upon the tube so that one end presses harder than the other end. Furthermore, inasmuch as the split ends 38 and 39 are pressed tight against each other for the entire length of the split collar, there is no opportunity for water or other moisture to enter into the space between the collars and the tube, whereby when it once freezes it compresses the tube inwardly and then after it thaws a larger amount of water may enter and then when it freezes again the tube is further compressed in. Under repeated cycles of thawing and freezing, the tube 26 is eventually squeezed flat in those cases where water may enter between the inner surface of the collars and the external surface of the tube 26. In my invention, there is no possibility for water or other moisture to enter, whereby the tube may be damaged as explained above.

In Figure 1, a sealing ring 30 is disposed in an internal groove 28 located within the hexagonal nut portion 31 between the two threaded ends 22 and 23. The scale for the drawings is double size for a one-half inch tubing. The sealing ring 30 is $\frac{3}{32}$ of an inch in body cross-section and $\frac{7}{16}$ of an inch I. D. and $\frac{5}{8}$ of an inch O. D. and comprises resilient and deformable material of a rubber-like nature. Upon inserting the tube through the sealing ring, its internal diameter is enlarged $\frac{1}{16}$ of an inch. The ring in its deformed shape fills the groove 28 and makes a good sealing engagement between the bore 27 and the tube 26. The sealing rings 30 are sometimes referred to as "O" rings and have been standardized as to size. The smallest ring in body cross-section is $\frac{3}{32}$ of an inch for a one-half inch tubing. This size ring is too large to locate between the tube 26 and the male threads 23. I have discovered that I can solve the problem by locating the sealing ring in the hexagonal nut portion 31 where the wall thickness of the fitting element 20 is the greatest. The clearance between the tube 26 and the bore 27 is relatively small, in the order of a few thousandths of an inch and thus the sealing ring 30 will withstand a great deal of pressure, in the order of several thousand pounds per square inch without extruding between the tube and the bore.

The substantially parallel gripping of the tube by the split collar, which avoids the concentration of stresses as would be the case if the split collar were cocked, enables my coupling to withstand a great deal of vibration.

The wedging of the external cam surface on the end of the split collar 34 into the internal cam surface 25 on the fitting element tends to slightly expand the threaded body, whereby the male threads 23 fit tightly into the female threads 24 to keep the compression nut 21 from becoming loose. Upon loosening the compression nut 21 by a tool, the threaded body contracts to its original position, and the compression nut may be easily and totally removed from the fitting element.

In Figure 4, I show a modified coupling or fitting element 42, in that a sealing ring 43 is located in an internal groove 44 provided in the threaded body around which the compression nut 21 engages. The sealing ring 43 is not of a standardized size, but is special. Its body cross-sectional area is approximately $\frac{1}{16}$ of an inch and when deformed by inserting the tube therein, fills the groove 44. The largest internal diameter for a standardized "O" ring for a $\frac{1}{16}$ of an inch body cross-section is ⅜ of an inch. The use of a larger "O" ring in body cross-section is preferable, as shown in Figure 1, but in many cases the smaller special size ring, as shown in Figure 4, is very practical.

In Figure 5, another modified fitting element 45 is shown with a rectangular space 47 provided in the right-hand end thereof to receive an "O" ring 46, which when pressed and deformed by the split collar fills the rectangular space. For the ring 46, a standardized 1/16 of an inch body cross-section and ⅜ of an inch internal diameter "O" ring may be used by stretching the ring over the tube.

The Figure 6 shows a modified split collar 52 having an external tapered surface 54 to engage in internal tapered surface 55 of the compression nut 53. The fitting element 50 is similar to the fitting element 20 shown in Figure 1, except that it has substantially a square abutting end 56 against which the split collar 52 abuts. The tapered surfaces 54 and 55 define a slow taper and engage each other for a distance substantially the full length of the split collar 52, so that the radial pressure upon the tube is substantially uniform from one end of the collar to the other. The fitting or coupling element and the compression nut of Figure 4 may also be modified to receive the split collar 52 similar to the way in which the coupling element and the compression nut of Figure 1 was modified to receive the collar to make Figure 6.

The Figure 7 is comparable to Figure 5, with the coupling element and compression nut modified to receive the split collar 62. The modified coupling element is indicated by the reference character 53. The compression nut is the same as shown in Figure 6. The right-hand end of the coupling element 53 and the left-hand end of the split collar 62 are provided with matching grooves to receive a sealing ring 61 to block leakage of fluid pressure. The sealing ring is compressed against the tube. A flat type of sealing rings may be used between the fitting or coupling element and the split collar, but the "O" ring type is preferable, since an annular metal-to-metal contact is provided between the coupling element and the split collar to prevent crushing of the sealing ring.

The split collar, which operates as a cam ring to grip the tube, may be steel for both steel and aluminum alloy tubing. It may be provided with a hardened surface such as by chrome plating. When the fluid pressures are not excessive the split collars may be made out of an aluminum alloy for use with aluminum alloy tubing.

In all forms of my invention, the cam surfaces between the compression nut and the split collar produces radial pressure against the tube incident to a longitudinal force tending to pull the tube away from the fitting element. The sealing rings being of yieldable and deformable material permits longitudinal movement of the tube therein, whereby the cam surfaces are free to function for setting up said radial pressure incident to the existence of said longitudinal force. With a flare on the end of the tube and with the tube compressed by cam surfaces at a remote place from the flare to absorb vibration, the cam surfaces are not free to function, since the flare tends to hold the tube against longitudinal pull or give and prevents a longitudinal force to exist between the cam compression device and the fitting element. Even though the compression nut may become slightly loose, my invention is still operative to hold and seal the tube, since a longitudinal force on the tube generates a greater gripping action as the pull in the tube is increased. For aluminum alloy tubing which is softer than steel tubing, my invention has particular utility since the softer tubing may tend to take a permanent compressed set under the split collar and thus under extreme conditions of vibration may become loose in the split collar. With a flare on the end of a tube where no give or slippage can take place unless the flare is ruptured, the tube may become permanently loose within the split collar. However, with my invention, the tube can give or slip within the seal, whereby the tubing may be slightly drawn back in the contracted split collar where a firm grip is always kept on the tube. The give or slippage necessary to make the split collar keep a firm grip on the tube is extremely slight because the cam surfaces are immediately brought into play upon the existence of a longitudinal force tending to pull the tube from the fitting element.

Under continual pull, the softer metal tubing may tend to grow, build-up or gather in advance of the split collar, whereby the presence of the collected material will give additional strength to the mechanical gripping action. Inasmuch as the sealing ring is in advance of the split collar the internal pressure of the fluid supports the tube internally as well as the support afforded by the body of the metal tubing itself. During the gathering stage, the tube may give or slightly slip longitudinally relative to the split collar. The gathered material will tend to flow into the small annular space in advance of the split collar. When the annular space is filled up the holding power of the split collar becomes increasingly greater. The gathering of the material as above described is made possible by reason of the fact that the sealing ring allows the tube to move longitudinally therein.

My invention has another advantage in that the rubber-like seal absorbs vibration from the tube and further, I have but a single means to engage the tube for holding same against longitudinal pull, and thus does not require a correct relationship between two or more fixedly disposed parts where the machining must be held to close tolerances.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A coupling device for attaching a tube to a threaded fitting element having an end and a bore extending from said end to receive the tube, means including a sleeve nut and a split cam ring contractible about said tube and engaging the end of the fitting element for anchoring the tube to the fitting element, said cam ring and said end having annular opposed surfaces for making a surface-to-surface abuttable engagement with each other, an internal annular groove having at least one wall in the fitting element extending outwardly from the bore, and seal means in the groove surrounding the tube and engaging said wall to seal between the tube and the fitting element independently of any mechanical pressure incident to the anchoring of the sleeve nut and cam ring to the fitting element.

2. A coupling device for attaching a tube to a threaded fitting element having an end and a bore extending from said end to receive the tube, means including a sleeve nut and a cam ring contractible about said tube for anchoring the tube to the fitting element, said cam ring and said end having annular opposed surfaces for resisting relative pressing forces between said cam ring and the end of the fitting element, an internal annular groove in the fitting element extending outwardly from said bore and longitudinally spaced from the end of said fitting element, and seal means in the groove surrounding the tube to seal between the tube and the fitting element independently of any mechanical pressure incident to the anchoring of the sleeve nut and cam ring to the fitting element.

GEORGE V. WOODLING.

REFERENCES CITED

The following references are of record in the file of this patent:

UNITED STATES PATENTS

| Number | Name | Date |
|---|---|---|
| 1,327,106 | Leahy | Jan. 6, 1920 |
| 1,796,806 | Pearson | Mar. 17, 1931 |
| 2,349,170 | Jackman | May 16, 1944 |
| 2,412,664 | Wolfram | Dec. 17, 1946 |

FOREIGN PATENTS

| Number | Country | Date |
|---|---|---|
| 17,362 | Netherlands | Dec. 15, 1927 |
| 599,646 | France | Oct. 23, 1925 |